T. E. MURRAY.
VEHICLE HUB.
APPLICATION FILED MAR. 8, 1917.

1,259,269.

Patented Mar. 12, 1918.

INVENTOR
Thomas E. Murray
BY Park Benjamin
his ATTORNEY

UNITED STATES PATENT OFFICE.

THOMAS E. MURRAY, OF NEW YORK, N. Y.

VEHICLE-HUB.

1,259,269. Specification of Letters Patent. Patented Mar. 12, 1918.

Application filed March 8, 1917. Serial No. 153,268.

*To all whom it may concern:*

Be it known that I, THOMAS E. MURRAY, a citizen of the United States, residing at New York, in the county of New York and State of New York, have invented a certain new and useful Improvement in Vehicle-Hubs, of which the following is a specification.

The invention relates to vehicle hubs stamped, pressed or struck up from sheet metal, and consists in the construction more particularly hereinafter set forth. The object of the invention is to simplify and cheapen the hub.

In the accompanying drawings—

Figure 1:
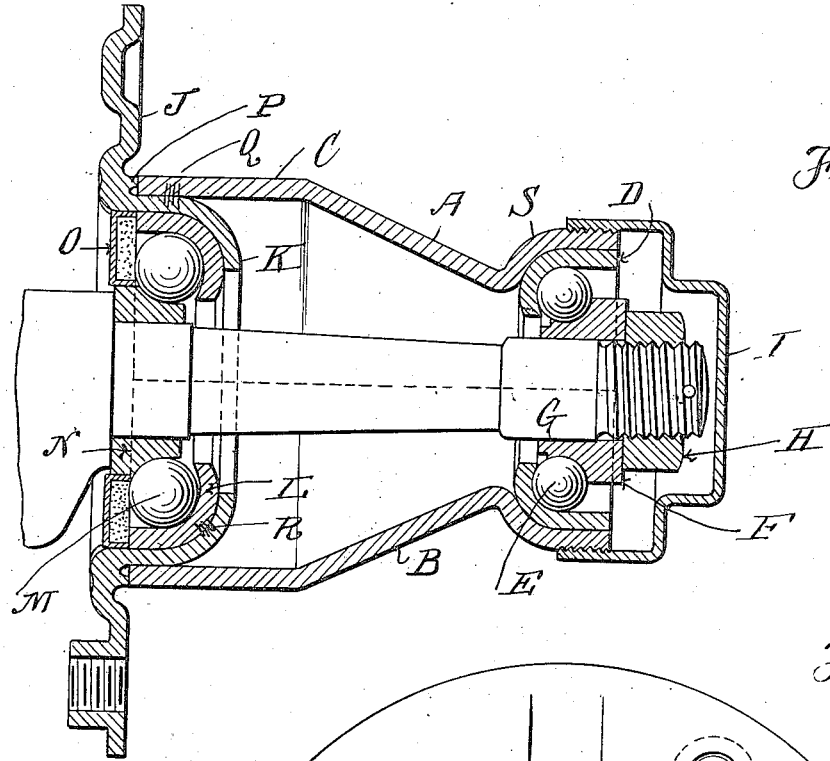
Figure 2:
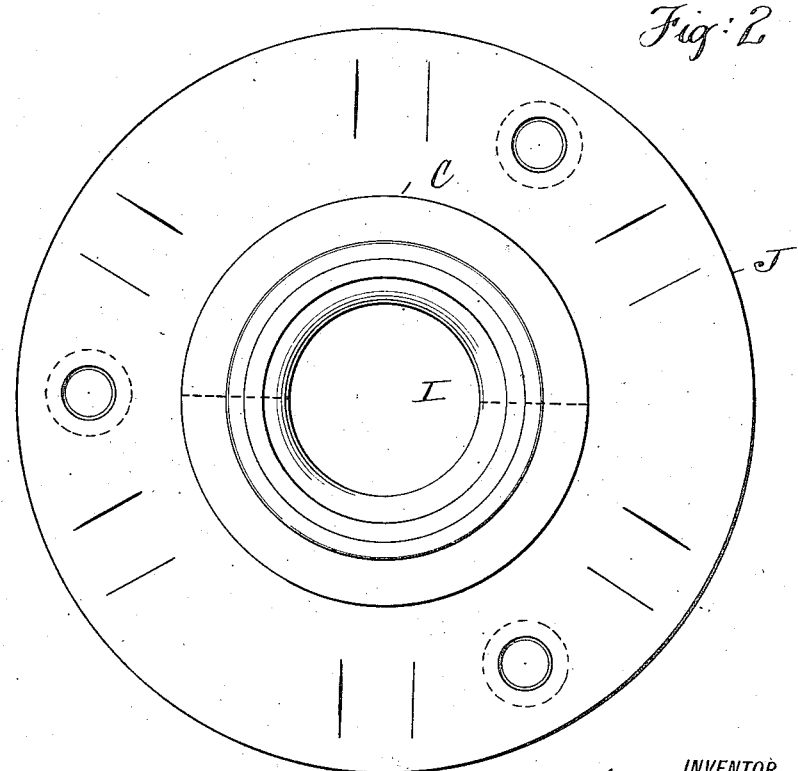

Figure 1 is a diametrical section of my hub. Fig. 2 is a face view.

Similar letters of reference indicate like parts.

The tubular hub shell is formed of sheet metal, and comprises two semi-tubular portions A, B, electrically welded together at their longitudinal edges. The cylindrical portion C of the shell receives the wheel, not shown. The outer end of the shell is enlarged at S to receive the raceway D for the bearing-balls E. Said balls are received in a groove in the collar F on the axle G. The end of the axle is threaded to receive a nut H. The usual cap I covering the ball-bearing and end of the hub is provided.

J is a flange plate, against which the wheel nave bears when in place on the cylindrical portion C of the hub. Said flange has an outwardly struck up projection K which fits closely in the cylindrical portion C of the hub. Said projection is internally concave, and receives the race-way L for the bearing-balls M. Said balls are supported in a grooved collar N on axle G. A grooved ring O containing grease-retaining material may also be fitted on the collar N.

The shell is electrically welded at its inner circumferential edge to a rib P on the outer side of flange J, and also, if desired, to the projection K at a number of spots, as Q. The ball races L may also be welded to the projection K at a number of spots, as R.

The ball-bearing within the enlargement S constitutes an abutment for the nut H.

I claim:

1. A sheet metal vehicle hub, comprising a tubular shell, and an annular flange plate having an integral central annular projection entering said shell, the inner circumferential edge of said shell being electrically welded to the face of said flange.

2. A sheet metal vehicle hub, comprising a shell formed of two semi-tubular sections electrically welded at their longitudinal edges, and an annular flange plate having an integral annular projection entering and fitting said shell, the inner circumferential edge of said shell being electrically welded to the face of said flange plate.

3. A sheet metal vehicle hub, comprising a tubular shell, and an annular flange plate having an integral central annular projection entering and fitting said shell, the said projection being internally concave, and a ball-bearing race-way secured in said projection.

4. A sheet metal vehicle hub, comprising a shell formed of two semi-tubular sections electrically welded at their longitudinal edges, and an annular flange plate, the inner circumferential edge of said shell being electrically welded to the face of said flange.

In testimony whereof I have affixed my signature in presence of two witnesses.

THOMAS E. MURRAY.

Witnesses:
 GERTRUDE T. PORTER,
 MAY T. MCGARRY.